Patented Aug. 6, 1940

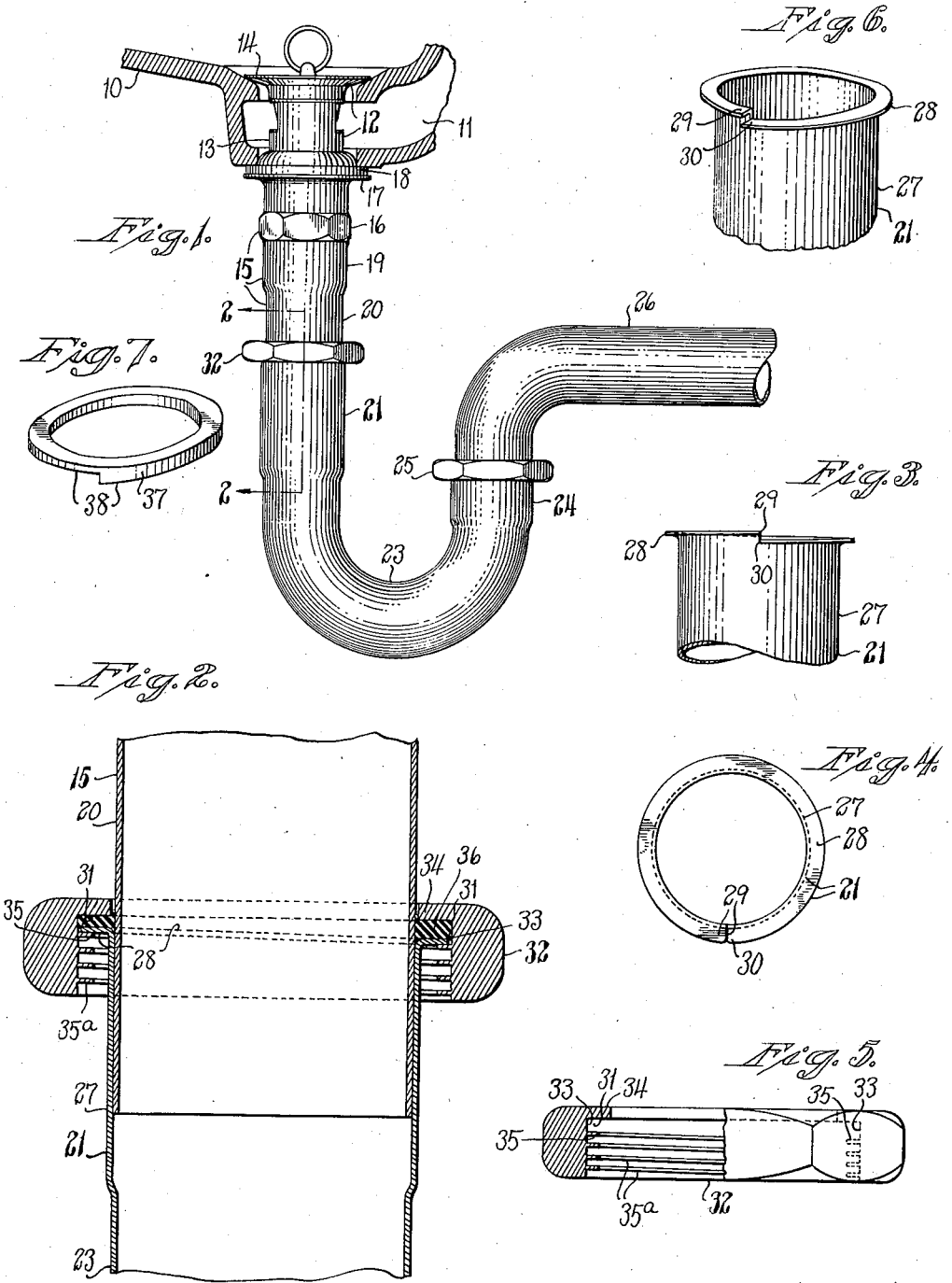

2,210,178

UNITED STATES PATENT OFFICE 2,210,178

PLUMBING FIXTURE

Adolph C. Recker, Watertown, Conn., assignor to Chase Brass & Copper Co., Incorporated, Waterbury, Conn., a corporation Application November 26, 1938, Serial No. 242,482

2 Claims. (Cl. 285—11)

This invention relates to an improved slip-joint construction for plumbing fixtures and more especially to an improved slip-joint construction of this character wherein the tubular-members to be joined are formed of tubing and preferably of seamless drawn tubing composed of non-ferrous metals.

The primary object of the present invention is to provide an improved slip-joint connection for the telescopically-interfitting members of a plumbing fixture whereby a better and more securely fastened slip-joint is formed between the said interfitting members than that provided in slip-joints of present well-known constructions.

One of the objects of this invention is to provide an improved slip-joint construction whereby the manufacturing costs in quantity production of plumbing fixtures embodying slip-joint connections may be lowered and made available to consumers in a comparatively inexpensive form. For this purpose, the invention has for its object to reduce the number of parts to be operated upon in quantity production of slip-joint connections for plumbing fixtures; to simplify the construction of the said parts and the character of the operations to be performed thereon; and to minimize the handling of said parts by workmen during the manufacturing process.

Another object of the invention is to provide an improved slip-joint construction for plumbing fixtures having tubular-members formed of seamless drawn tubing such, for example, as those constructed of non-ferrous metals for the purpose of minimizing the weight and consequent costs of parts required for any particular installation.

A specific object of the present invention is to reduce the time-, labor-, and material-costs in the manufacture of the female tubular-members of slip-joint connections employed in plumbing fixtures for many purposes. For this purpose, the invention contemplates tubular-members constructed from sections of seamless drawn tubing having a minimum wall-thickness and helical terminal-flanges formed by displaced integral portions of the seamless tubing to enable them to be joined to male tubular-members which are to be telescopically-interfitted therewith.

A further object of the invention is to provide an improved slip-joint construction for plumbing fixtures whereby a more effective slip-joint connection may be formed between telescopically-interfitted male and female tubular-members constructed of seamless drawn tubing by providing a gasket-chamber of peculiar form to enhance the interlocking effect of an axially-compressible and transversely-expandable gasket upon said members.

With the above and other objects in view, as will appear to those skilled in the art from the present disclosure, this invention includes all features in the said disclosure which are novel over the prior art.

In the accompanying drawing, in which one mode of carrying out the present invention is shown for illustrative purposes:

Fig. 1 is a view in side elevation of a drain-and-overflow connection for a lavatory bowl showing an adaptation of the present invention;

Fig. 2 is an enlarged vertical section on the line 2—2 of Fig. 1;

Fig. 3 is a view in side elevation of the upper end of one of the female tubular-members;

Fig. 4 is a top-plan view of the same;

Fig. 5 is a view of the slip-joint nut shown partly in front elevation and partly in vertical section;

Fig. 6 is a perspective view of one of the female tubular-members; and

Fig. 7 is a perspective view of a modified form of gasket which is preformed with a helical end-wall.

According to the embodied form of the invention shown in the drawing, a lavatory bowl 10 which is provided with an overflow-channel 11, carries a drain-plug which is generally designated by the reference character 12. The said drain-plug 12 includes a body-member 13 which is provided with a flanged top 14 through which water discharges from the lavatory bowl 10 and has an exteriorly-threaded shank portion (not shown) to which is threaded a tail-piece generally designated by the reference character 15. The said tail-piece is provided with a hexagonal wall 16 to receive a wrench for the purpose of screwing a flanged top-portion 17 thereof into clamping engagement with a washer 18 which is interposed between the flanged top-portion 17 and the bottom wall of the lavatory bowl 10. For this purpose, the flanged top-portion 17 of the tail-piece 15 is provided interiorly with screw-threads (not shown) for threaded engagement with the threaded shank of the drain-plug 12.

Integrally formed with the hexagonal portion 16 and flanged-top 17 of the tail-piece 15 and connected thereto by a portion 19, is a portion 20 somewhat reduced in diameter which, for the purposes of the present description may be considered as a male member which is to be telescopically interfitted with a female tubular-member which is generally designated by the reference character 21. According to the embodied form of the invention shown on the drawing, the female tubular-member 21 forms an enlarged upward extension of a widespread band 23, the inner diameter of the said female tubular-member being sized to receive the male tubular-member 20 with a free sliding fit. At its discharge-outlet end, the widespread bend 23 is provided with a second female tubular-member designated generally by the reference character 24 and which is connected by a slip-joint nut 25 to a wall-tube elbow 26, the slip-joint being of substantially-similar construction to that described below.

According to the embodied form of the invention, and as shown especially well in Fig. 2, the female tubular-member 21 comprises a tubular body-portion 27 provided at the top with an integral terminal-flange 28. For this purpose, a short slit is made in the tubular body-portion 27 at its upper end after which a corresponding portion of its tubular wall is turned outwardly and shaped to form the terminal-flange. As shown in Figs. 2, 3 and 4, the terminal-flange 28 is of helical form and, as shown in Fig. 3, the juxtaposed ends 29 and 30 of the terminal-flange 28 are presented in opposite circumferential directions and in axially-spaced relation, each with respect to the other. The top surface of the terminal-flange 28 constitutes an inclined bottom wall for an annular gasket-chamber 31 (see Fig. 2). The outer cylindrical wall of the male tubular-member 20 constitutes the inner cylindrical wall of the annular gasket-chamber 31.

Extending around the terminal-flange 28 is a slip-joint nut represented generally by the reference character 32. The said slip-joint nut 32 is provided with an inner cylindrical wall 33 which forms an outer cylindrical wall for the gasket-chamber 31. The slip-joint nut 32 is also provided with an annular top-flange 34 which is substantially in rotational engagement with the outer cylindrical wall of the male tubular-member 20, the under surface of the said annular top-flange 34 being thus disposed to serve as the top wall of the annular gasket-chamber 31. From the foregoing, it will be understood that the annular gasket-chamber 31 is a substantially-closed chamber provided with an annular top wall arranged substantially in a plane normal to the common axis of the tubular-members and a helical bottom wall which increases the axial depth of said gasket-chamber in the circumferential direction in which the slip-joint nut 32 is tightened when the slip-joint is completed.

Presented inwardly from the inner cylindrical wall 33 of the slip-joint nut 32 is a helical flange 35 which constitutes the inner convolution of fin-like internal threads 35a, the said flange being constructed and arranged to slidably engage the under side of the terminal-flange 28 of the female tubular-member 27. Arranged within the annular gasket-chamber 31 is an annular resilient gasket 36 preferably formed of rubber, which may be compressed therein to any desired extent by a clockwise rotation of the slip-joint nut 32 as seen from above, upon the terminal-flange 28.

The annular gasket 36 may be constructed of any suitable material to render it axially-compressible and transversely-extensible to a degree sufficient to meet the peculiar requirements of each particular installation of the plumbing fixtures. From the foregoing, it will now be readily understood that when the slip-joint nut 32 is tightened in position on the terminal-flange 28, the annular gasket 36 will be compressed axially while, at the same time, due to its axial-compression and to the rotational movement of the nut, it will be deformed around and over the terminal-flange 28 to conform to the axial deepening of the gasket-chamber 31 in the direction in which the slip-joint nut 32 is screwed home on the terminal-flange 28. If desired, the gasket-chamber 31 may be sealed by means of a compressible-gasket 37 which, as shown in Fig. 7, is preformed with one helical end-face 38 to conform to the terminal-flange 28 of the female tubular-member 27. In this way, the annular gasket is adapted to be compressed axially within the gasket-chamber 31 without being otherwise deformed when the slip-joint nut 32 is screwed home on the terminal-flange 28. By making the gasket in this manner, and of suitable thickness for any particular installation, an effective seal for the slip-joint can be obtained by any desired advance of the slip-joint nut over the helical terminal-flange on the female tubular-member. In consequence, a cushioned interlocking connection is formed between the slip-joint nut 32 and the terminal-flange 28 which is effective, in a peculiar way, to prevent an accidental loosening of the nut 32 in places where this is liable to occur such, for example, as in and around factories, machine-shops, and other places in which the plumbing may be exposed to considerable vibration. It is readily seen that under such conditions, an initial unscrewing movement of the said slip-joint nut 32 is resisted not only by the resilient grip of the gasket on the nut, but also by reason of a resulting tendency of such an initial movement to crowd the already compressed gasket 36 into a more contracted space within the annular gasket-chamber 21.

While the present invention is shown and described, for illustrative purposes, in its adaptation to one type of drain-and-overflow connection for lavatory washbowls, it is readily seen that the said invention may be advantageously employed in plumbing fixtures of various forms and for other purposes for which slip-joint connection may be found to be useful. Examples of such uses may be found, for example, in various kinds of pipe-fittings, such as elbows, double offsets, T's, long waste bends, high-tank elbows, etc., employed in continuous waste combinations; exposed or concealed installations of bath fixtures; closet fixtures; etc.; etc.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. A slip-joint connection for plumbing fixtures, comprising: a female tubular-member having one end of its tubular wall turned outwardly and shaped to provide a helical terminal-flange; a male tubular-member telescopically interfitted with said female tubular-member; a slip-joint nut encircling and rotatable relatively to the said tubular-members and having an annular gasket-recess above said helical terminal-flange; and a distortable gasket in said gasket-recess; said nut having an internal screw-thread screw-threadedly engaging the under surface of said helical terminal-flange and forcing the upper surface of said flange against and distorting said distortable gasket to form a water-tight connection between said tubular-members.

2. A slip-joint connection for plumbing fixtures, comprising: a female tubular-member of seamless drawn non-ferrous metal and having one end of its tubular wall slitted and turned outwardly and shaped to provide a split helical terminal-flange; a male tubular-member of seamless drawn non-ferrous metal and telescopically interfitted with said female tubular-member; a slip-joint nut encircling and rotatable relatively to the said tubular-members and having an annular gasket-recess above said helical terminal-flange; and a distortable gasket in said gasket-recess; said nut having an internal screw-thread screw-threadedly engaging the under surface of said helical terminal-flange and forcing the upper surface of said flange against and distorting said distortable gasket to form a water-tight connection between said tubular-members.

ADOLPH C. RECKER.